US008447480B2

(12) United States Patent
Usukura (10) Patent No.: US 8,447,480 B2
(45) Date of Patent: May 21, 2013

(54) TRANSMISSION CONTROL METHOD FOR CONTINUOUSLY VARIABLE TRANSMISSION

(75) Inventor: Yasutaka Usukura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 973 days.

(21) Appl. No.: 12/361,171

(22) Filed: Jan. 28, 2009

(65) Prior Publication Data

US 2009/0197735 A1 Aug. 6, 2009

(30) Foreign Application Priority Data

Jan. 31, 2008 (JP) .................................. 2008-022025

(51) Int. Cl.
*F16H 61/66* (2006.01)
*G06F 17/00* (2006.01)

(52) U.S. Cl.
USPC .............. 701/55; 701/51; 701/103; 701/113; 477/37; 477/43; 477/46; 477/52

(58) Field of Classification Search
USPC ................... 701/55, 51, 53; 477/43, 3, 34, 37
See application file for complete search history.

(56) References Cited

U.S. PATENT DOCUMENTS

| | | | | |
|---|---|---|---|---|
| 5,947,861 A * | 9/1999 | Nobumoto | ...................... | 477/37 |
| 6,102,176 A * | 8/2000 | Fujikawa | ...................... | 192/3.58 |
| 6,169,950 B1 * | 1/2001 | Parigger | ...................... | 701/53 |
| 6,436,005 B1 * | 8/2002 | Bellinger | ...................... | 477/111 |
| 6,852,064 B2 * | 2/2005 | Carlson et al. | ................... | 477/52 |
| 6,887,174 B2 * | 5/2005 | Suzuki et al. | ................... | 474/28 |
| 7,559,872 B2 * | 7/2009 | Matsudaira et al. | ............ | 477/46 |
| 7,727,109 B2 * | 6/2010 | Matsubara et al. | ............... | 477/3 |
| 7,912,626 B2 * | 3/2011 | Usukura | ........................ | 701/115 |
| 7,930,091 B2 * | 4/2011 | Usukura et al. | ............... | 701/113 |
| 2002/0132699 A1 * | 9/2002 | Bellinger | ...................... | 477/107 |
| 2003/0027673 A1 * | 2/2003 | Suzuki et al. | ................... | 474/28 |
| 2003/0125153 A1 * | 7/2003 | Kukucka et al. | ............. | 475/198 |
| 2003/0216847 A1 * | 11/2003 | Bellinger | ....................... | 701/51 |
| 2004/0014557 A1 * | 1/2004 | Carlson et al. | ................... | 477/37 |
| 2007/0004552 A1 * | 1/2007 | Matsudaira et al. | ............ | 477/37 |
| 2008/0194371 A1 * | 8/2008 | Matsubara et al. | ........... | 475/150 |
| 2008/0227591 A1 * | 9/2008 | Imamura et al. | .................. | 477/3 |
| 2008/0228376 A1 * | 9/2008 | Usukura et al. | ............... | 701/103 |
| 2009/0132135 A1 * | 5/2009 | Quinn et al. | .................... | 701/55 |
| 2009/0193802 A1 * | 8/2009 | Usukura et al. | ................. | 60/431 |
| 2009/0197735 A1 * | 8/2009 | Usukura | ......................... | 477/43 |
| 2010/0204007 A1 * | 8/2010 | Winkel et al. | .................... | 477/34 |

FOREIGN PATENT DOCUMENTS

| | | |
|---|---|---|
| DE | 103 32 542 B4 | 2/2004 |
| DE | 10 2006 029 673 A1 | 1/2007 |

(Continued)

*Primary Examiner* — Thomas Black
*Assistant Examiner* — Wae Louie
(74) *Attorney, Agent, or Firm* — Birch, Stewart, Kolasch & Birch, LLP (57) ABSTRACT

A transmission control method for a continuously variable transmission for enhancing the response of a change in engine speed to a driver's accelerating/decelerating operation. In a hydraulic type continuously variable transmission, when a sport operating mode is being selected (step S1: SPORT OPERATING MODE), a target engine speed T_NE (rpm) is calculated from the vehicle velocity V (km/hr) and the position θ (degrees) of a throttle valve 60 (step S4). Further, a target angle T_A (degrees) for a motor swash plate is calculated from the vehicle velocity and the target engine speed T_NE (step S5). The motor swash plate is moved according to the difference between the actual angle A of the motor swash plate 46 and the target angle T_A.

18 Claims, 4 Drawing Sheets

FOREIGN PATENT DOCUMENTS

| | | |
|---|---|---|
| JP | 61-23351 A | 1/1986 |
| JP | 8-6797 B2 | 1/1996 |
| JP | 2002-372136 A | 12/2002 |
| JP | 2006-200727 A | 8/2006 |
| JP | 2007-10045 A | 1/2007 |
| JP | 2007-16967 A | 1/2007 |

* cited by examiner

TRANSMISSION CONTROL METHOD FOR CONTINUOUSLY VARIABLE TRANSMISSION

CROSS-REFERENCE TO RELATED APPLICATIONS

The present application claims priority under 35 USC 119 to Japanese Patent Application No. 2008-022025 filed on Jan. 31, 2008 the entire contents of which are hereby incorporated by reference.

BACKGROUND OF THE INVENTION

1. Field of the Invention

The present invention relates to a transmission control method for a continuously variable transmission. More particularly, the present invention relates to a transmission control method for a continuously variable transmission for enhancing the response of the transmission attendant on a driver's accelerating/decelerating operation.

2. Description of Background Art

As a continuously variable transmission for use in a vehicle such as a motorcycle, a hydraulic type continuously variable transmission has been known. See, for example Japanese Patent Publication No. Hei 08-006797; Japanese Patent Laid-open No. 2006-200727 or Japanese Patent Laid-open No. 2007-016967.

The hydraulic type continuously variable transmission basically uses the control of a target engine speed in which transmission gear ratio is changed according to the difference between an actual engine speed (rpm) and the target engine speed. More specifically, when the actual engine speed is lower than the target engine speed, the transmission gear ratio is lowered so as to raise the actual engine speed. When the actual engine speed is higher than the target engine speed, on the other hand, the transmission gear ratio is raised so as to lower the actual engine speed.

In the target engine speed control as above-mentioned, the transmission gear ratio is changed at the time when a difference is generated between the actual engine speed and the target engine speed. Therefore, a time lag may possibly be generated between a change in the position (angle) of a throttle valve varied according to the driver's accelerating/decelerating operation and a change in engine speed. More specifically, on one hand, the position of the throttle valve is usually changed directly according to an operational amount of a throttle grip or an accelerator pedal. As above-mentioned, in the target engine speed control, on the other hand, the actual engine speed is varied by changing the transmission gear ratio while checking the difference being generated between the actual engine speed and the target engine speed, so that the change in the engine speed is delayed behind the change in the position of the throttle valve.

Such a phenomenon is not limited to hydraulic type continuously variable transmissions but is similarly generated also in other continuously variable transmissions such as frictional type continuously variable transmissions (belt-type continuously variable transmission, toroidal continuously variable transmission, etc.) and electric power type continuously variable transmissions.

SUMMARY AND OBJECTS OF THE INVENTION

The present invention has been made in consideration of the above-mentioned problem. Accordingly, it is an object of an embodiment of the present invention to provide a transmission control method for a continuously variable transmission by which it is possible to enhance the response of a change in engine speed to a driver's accelerating/decelerating operation.

The transmission control method for a continuously variable transmission according to an embodiment of the present invention has the following characteristics.

First characteristic: A transmission control method for a continuously variable transmission having a plurality of transmission control modes, wherein in a first transmission control mode, an actual transmission gear ratio is lowered when a target engine speed calculated from vehicle velocity and throttle position is higher than an actual engine speed, and the actual transmission gear ratio is raised when the target engine speed is lower than the actual engine speed; and in a second transmission control mode, a target transmission gear ratio is calculated based on the target engine speed, which is calculated from the vehicle velocity and the throttle position, and the vehicle velocity, and the actual transmission gear ratio is changed toward the calculated target transmission gear ratio.

According to an embodiment of the present invention, the target transmission gear ratio is calculated from the target engine speed, and the actual transmission gear ratio is changed toward the target transmission gear ratio. This makes it possible to change the actual transmission gear ratio toward the target transmission gear ratio without waiting for the generation of a difference between the actual engine speed and the target engine speed. Therefore, it is possible to enhance the response of the change in engine speed to the driver's accelerating/decelerating operation.

Second characteristic: The continuously variable transmission has a transmission movable member for changing the transmission gear ratio, and, in the second transmission control mode, the target transmission gear ratio is calculated as a function of the target engine speed and the vehicle velocity. A target position of the transmission movable member is calculated correspondingly to the calculated target transmission gear ratio, and the actual position of the transmission movable member is changed toward the calculated target position.

Third characteristic: The continuously variable transmission is a swash plate hydraulic type continuously variable transmission, and the transmission movable member is a motor swash plate or a movable member of a transmission actuator for controlling the angle of the motor swash plate.

Fourth characteristic: A transmission control method for a continuously variable transmission according to the present invention, wherein a target transmission gear ratio is calculated based on a target engine speed, which is calculated from vehicle velocity and throttle position, and the vehicle velocity, and the actual transmission gear ratio is changed toward the calculated target transmission gear ratio.

According to an embodiment of the present invention, a target transmission gear ratio is calculated from a target engine speed, and the actual transmission gear ratio is changed toward the target transmission gear ratio. This makes it possible to change the actual transmission gear ratio toward a target transmission gear ratio without waiting for the generation of a difference between the actual engine speed and the target engine speed. Therefore, it is possible to enhance the response of the change in engine speed to a driver's accelerating/decelerating operation.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Now, an embodiment of the present invention will be described below referring to the drawings.

Figure 1:
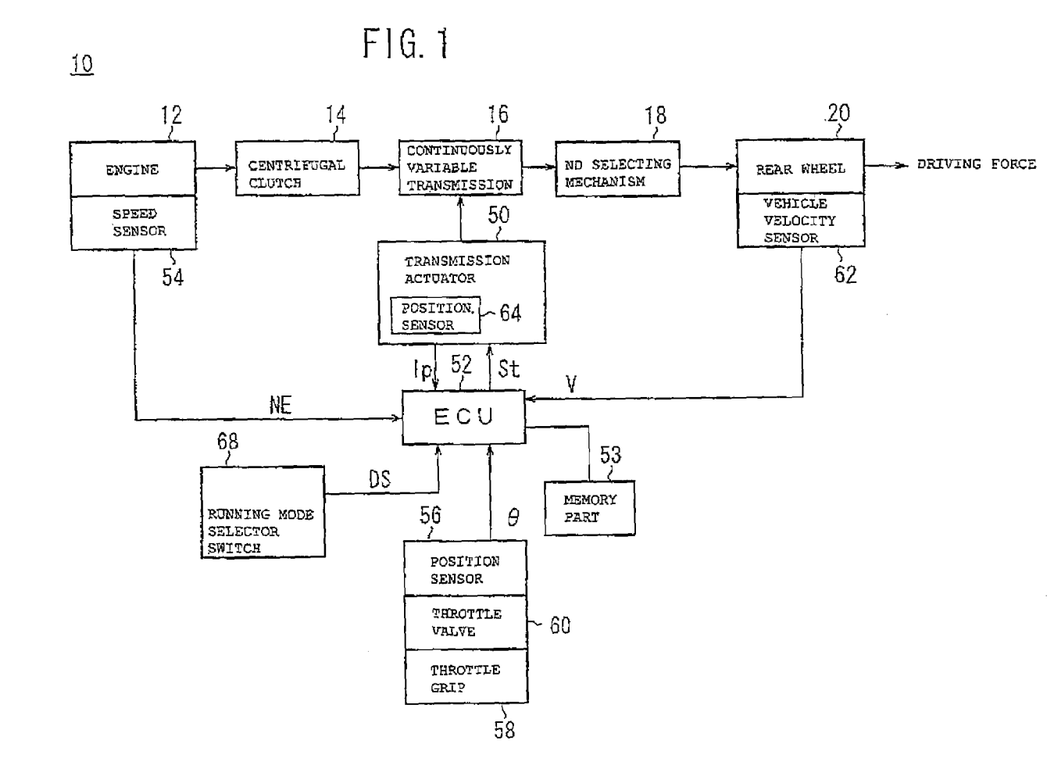
FIG. 1 is a block diagram of a vehicle equipped with a hydraulic type continuously variable transmission capable of performing the transmission control method according to one embodiment of the present invention.

FIG. 1 shows a schematic block diagram of a vehicle 10 such as a motorcycle equipped with a continuously variable transmission capable of performing a transmission control method according to one embodiment of the present invention. In the vehicle 10, a torque generated in an engine 12 is transmitted to a rear wheel 20 through a centrifugal clutch 14, a continuously variable transmission 16 and an ND selecting mechanism 18.

Figure 2:
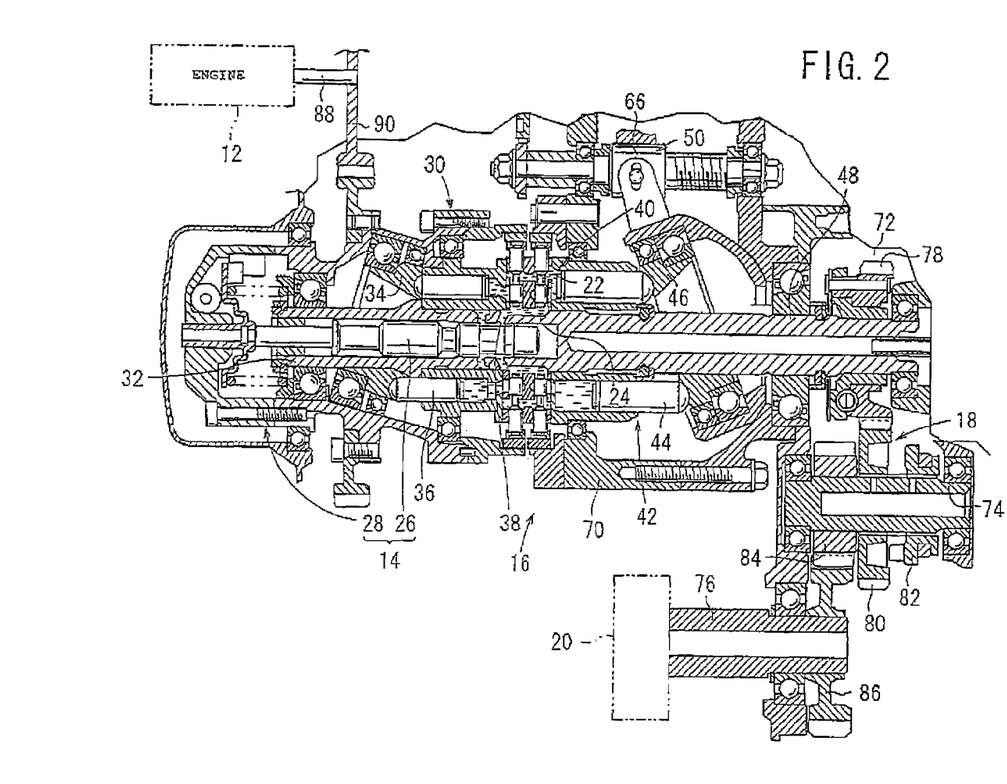
FIG. 2 is a partly omitted sectional view of the hydraulic type continuously variable transmission and the surroundings thereof.

FIG. 2 shows a partly omitted longitudinal sectional view of the centrifugal clutch 14, the continuously variable transmission 16 and the ND selecting mechanism 18; here, FIG. 9 of Japanese Patent Laid-open No. 2006-200727 is utilized.

The centrifugal clutch 14 includes a clutch valve 26 for connection/disconnection between a high pressure oil passage 22 and a low pressure oil passage 24 in the continuously variable transmission 16, and a centrifugal governor 28 for operating the clutch valve 26 according to engine speed NE (rpm). As the centrifugal clutch 14, for example, the one described in Japanese Patent Laid-open No. 2006-200727 can be used.

The continuously variable transmission 16 is a so-called swash plate hydraulic type continuously variable transmission. In the continuously variable transmission 16, the torque of the engine 12 is inputted to a hydraulic pump 30, in which the torque converted into an oil pressure of a working fluid 38 by use of an input shaft 32, a pump swash plate 34, a pump-side plunger 36 and the like. The working fluid 38 is transmitted to a hydraulic motor 42 through the annular high pressure oil passage 22 in a hydraulic closed circuit 40. In the hydraulic motor 42, the oil pressure of the working fluid 38 is re-converted into a torque by use of a motor-side plunger 44, a motor swash plate 46, an output shaft 48 and the like, and the torque is outputted.

The angle A (degrees) of the motor swash plate 46 in the hydraulic motor 42 is adjusted by use of a transmission actuator 50, whereby the magnitude of the torque transmitted is varied. In other words, by regulating the angle of the motor swash plate 46, the ratio between an input torque of the hydraulic pump 30 and the output torque of the hydraulic motor 42 (hereinafter referred to also as "transmission gear ratio R") can be controlled. The working fluid 38 transmitted from the hydraulic pump 30 to the hydraulic motor 42 is returned through the annular low pressure oil passage 24 in the hydraulic closed circuit 40 into the hydraulic pump 30, to be utilized again.

The transmission gear ratio R of the continuously variable transmission 16 is controlled by an ECU (electrical control unit) 52 (FIG. 1) of the vehicle 10 through the transmission actuator 50. The ECU 52 produces a control signal St according to an engine speed NE (rpm) detected by an engine speed sensor 54, the position of a throttle valve 60 (throttle position θ (degrees)) according to an operation of a throttle grip 58 which is detected by a throttle position sensor 56, and a vehicle velocity V (km/hr) detected by a vehicle velocity sensor 62, and the transmission actuator 50 is operated based on the control signal St. Thus, the angle A of the motor swash plate 46 (which corresponds substantially to the transmission gear ratio R) is controlled. The angle A of the motor swash plate 46 is calculated by the ECU 52 according to the position information Ip on a movable part 66 (FIG. 2) of the transmission actuator 50 which is given from a position sensor 64 provided at the transmission actuator 50. Or, alternatively, the motor swash plate 46 may be provided with an angle sensor, and the angle A of the motor swash plate 46 detected by the angle sensor may be directly used. In addition, a memory part 53 is connected to the ECU 52.

In addition, an operating mode is changed over by an operating mode selector switch 68 provided at a meter panel (not shown) of the vehicle 10. More specifically, a normal operating mode or a sport operating mode can be selected according to the position of the operating mode selector switch 68. The sport operating mode is a mode for realizing an operating which is sportier than the operating in the normal operating mode; in this embodiment, the sporty operating mode is designed so as to enhance the response of the output torque to an operation on the throttle grip 58. The operating mode selector switch 68 transmits to the ECU 52 a selected operating mode informing signal DS indicative of which of the normal operating mode and the spoil operating mode is being selected, and the ECU 52 changes over a transmission control to be used in the continuously variable transmission 16, by use of the selected operating mode informing signal DS. The changeover (selection) of transmission control will be described later in detail.

The ND selecting mechanism 18 is a mechanism by which a torque transmitted from the output shaft 48 (FIG. 2) of the continuously variable transmission 16 is transmitted to a rear wheel 20 (drive wheel). In the ND selecting mechanism 18, it is possible to make a changeover between a drive mode D in which the torque is transmitted to the rear wheel 20 and a neutral mode N in which the torque is not transmitted to the rear wheel 20. The ND selecting mechanism 18 is disposed inside a reduction chamber 72 formed on one side of a rear part of the inside of the transmission case 70. The ND selecting mechanism 18 includes an intermediate shaft 74 supported by the transmission case 70 in a turnable manner and in parallel to the output shaft 48 of the hydraulic motor 42, a drive shaft 76 supported by the transmission case 70 in a turnable manner and in parallel to the intermediate shaft 74, a primary drive gear 78 spline connected to that end part of the output shaft 48 which projects into the reduction chamber 72, a primary driven gear 80 rotatably supported by the intermediate shaft 74 and meshed with the primary drive gear 78, a dog clutch member 82 slidably spline fitted over the intermediate shaft 74 at a position on one side of and adjacent to the primary driven gear 80 (in FIG. 2, the dog clutch member 82 appears as being in a position for the neutral mode N, from which it comes into a position for the drive mode D when moved to the left), a secondary drive gear 84 connected to the intermediate shaft 74 at a position on the other side of and adjacent to the primary driven gear 80, and a secondary driven gear 86 spline connected to the drive shaft 76 and driven by the secondary drive gear 84 with speed reduction. The rear wheel 20 is attached to the outer end part of the drive shaft 76 which protrudes to the outside of the transmission case 70, so as to be rotated together with the drive shaft 76.

The components in this embodiment are configured as above-mentioned, and the changeover (selection) of transmission control in the continuously variable transmission 16 will now be described below.

Figure 3:
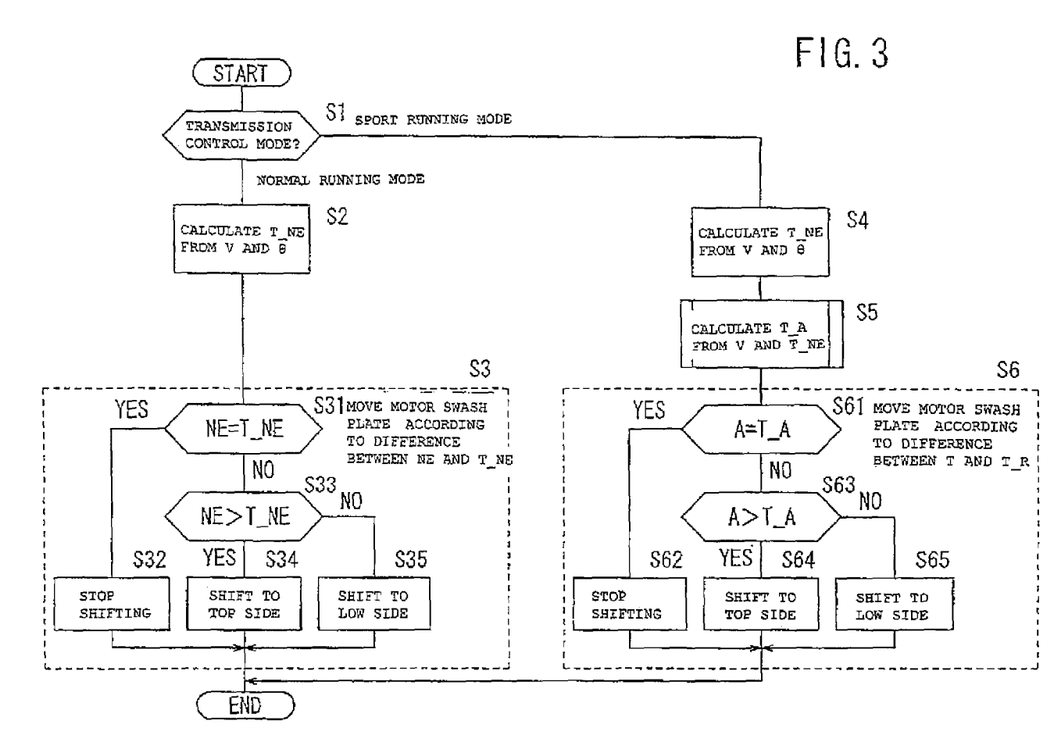
FIG. 3 is a flow chart of the transmission control of the continuously variable transmission, in the manner of separating the operating mode into a normal operating mode and a sport operating mode, in the embodiment.

FIG. 3 shows a flow chart for control of transmission gear ratio R of the continuously variable transmission 16 by a method according to a selected operating mode (normal operating mode/sport operating mode) in the ECU 52. In step S1, the ECU 52 determines which of the normal operating mode and the sport operating mode is being selected as the operating mode. More specifically, the operating mode selected at present is confirmed by checking the selected operating mode informing signal DS sent from the operating mode selector switch 68.

Where it is determined in step S1 that the normal operating mode is being selected (S1: NORMAL OPERATING MODE), in step S2 the ECU 52 calculates a target engine speed T_NE (rpm) according to a vehicle velocity V detected by the vehicle velocity sensor 62 and a throttle position θ detected by the throttle position sensor 56. As the method for calculating the target engine speed T_NE from the vehicle velocity V and the throttle position θ, for example, a method using a characteristic map described in FIG. 9 of Japanese Patent Laid-open No. 2007-016967 can be used.

In the subsequent step S3, the ECU 52 controls the motor swash plate 46 according to the difference between an actual engine speed NE detected by the engine speed sensor 54 and the target engine speed T_NE calculated in step S2. More specifically, in step S31, it is checked whether or not the actual engine speed NE and the target engine speed T_NE are equal. Where both the engine speeds are equal (S31: YES), in step S32 the angle A of the motor swash plate 46 is not changed, and the current transmission gear ratio R is maintained. Where it is determined in step S31 that the actual engine speed NE and the target engine speed T_NE are different (831: NO), it is determined in step S33 whether or not the actual engine speed NE is greater than the target engine speed T_NE. Where the actual engine speed NE is greater than the target engine speed T_NE (S33: YES), in step S34 the ECU 52 changes the angle A of the motor swash plate 46 to the TOP side (in FIG. 2, in the direction toward perpendicularity) through the transmission actuator 50, to thereby raise the transmission gear ratio R. Where the actual engine speed NE is not greater than the target engine speed T_NE (S33: NO), in step S35 the ECU 52 changes the angle A of the motor swash plate 46 to the LOW side (in FIG. 2, in the direction towards horizontal) through the transmission actuator 50, to thereby lower the transmission gear ratio R.

Returning to step S1, in the case where the sport operating mode is being selected (S1: SPORT OPERATING MODE), in step S4 the ECU 52 calculates a target engine speed T_NE. The method for calculating the target engine speed T_NE is the same as in step S2.

In the subsequent step S5, the ECU 52 calculates a target angle T_A (degrees) for the motor swash plate 46 according to the target engine speed T_NE calculated in step S4 and the vehicle velocity V detected by the vehicle velocity sensor 62. The method for calculating the target angle T_A will be described later.

In the subsequent step S6, the ECU 52 controls the motor swash plate 46 according to the difference between the angle A of the motor swash plate 46 calculated based on the position information Ip on the movable part 66 of the transmission actuator 50 given from the position sensor 64 and the target angle T_A calculated in step S5.

More specifically, in step S61, it is checked whether or not the actual angle A and the target angle T_A are equal, and, when both the angles are equal (S61: YES), in step S62 the angle A of the motor swash plate 46 is maintained. Where it is determined in step S61 that the actual angle A and the target angle T_A are different (S61: NO), it is determined in step S63 whether or not the actual angle A is greater than the target angle T_A. Where the actual angle A is greater than the target angle T_A (S63: YES), in step S64 the ECU 52 reduces the angle A of the motor swash plate 46 (changes the angle A to the TOP side (in FIG. 2, in the direction toward perpendicularity)) through the transmission actuator 50, thereby to raise the transmission gear ratio R (upshift). Where the actual angle A is not greater than the target angle T_A (S63: NO), in step S65 the ECU 52 increases the angle A of the motor swash plate 46 (to change the angle to the LOW side (in FIG. 2, in the direction towards horizontal)) through the transmission actuator 50, thereby to lower the transmission gear ratio R (downshift).

Figure 4:
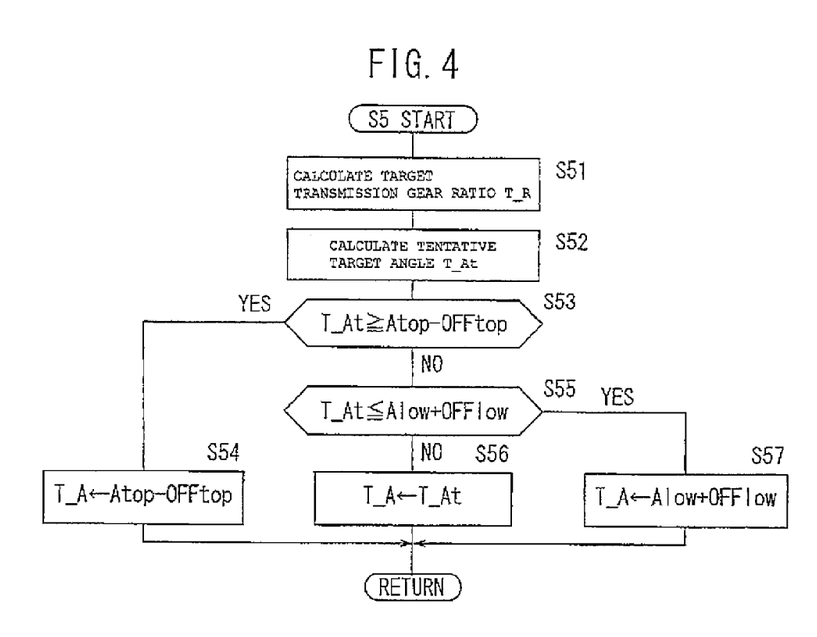
FIG. 4 is a flow chart of the calculation of a target angle for a motor swash plate from vehicle velocity and target engine speed.

FIG. 4 shows a flow chart of the calculation of the target angle T_A of the motor swash plate 46, as a subroutine of step S5 in FIG. 3. The calculation of the target angle T_A is performed by the ECU 52. In step S51, the ECU 52 calculates a target transmission gear ratio T_R for the continuously variable transmission 16. In this embodiment, the target transmission gear ratio T_R is calculated by use of the following formula (1):

$$T\_R = (T\_NE/V) \times Ro \times 0.06 \tag{1}$$

In the above formula (1), T_NE is the target engine speed calculated in step S4 in FIG. 3, V is the vehicle velocity detected by the vehicle velocity sensor 62, and Ro is the reduction gear ratio of other transmission gear than the continuously variable transmission 16, and 0.06 is a coefficient for unit matching. More specifically, for unit matching between the target engine speed T_NE (rpm) (the denominator of unit is "minute") and the vehicle velocity V (km/hr) (the denominator of unit is "hour"), the target engine speed T_NE is multiplied by 60. Further, for conversion of the circumferential length C (m) in the formula (2) set forth later into kilometer unit, multiplication by 1/1000 is carried out. As a result of multiplication of 60 fold by 1/1000 fold, the coefficient "0.06" comes to be used.

The reduction gear ratio Ro is a value obtained by dividing the circumferential length C (m) of the rear wheel 20 by the product of reduction gear ratios of other transmission gears than the continuously variable transmission 16, such as a primary reduction gear ratio R1 (the reduction gear ratio between a crankshaft 88 (FIG. 2) of the engine 12 and the drive gear 90), a final reduction gear ratio Rf (the reduction gear ratio between the secondary drive gear 84 and the secondary driven gear 86), etc. Thus, the reduction gear ratio Ro is obtained by the following formula (2):

$$Ro = C/(R1 \times R2 \times \ldots \times Rf) \tag{2}$$

In step S52, the ECU 52 calculates a tentative target angle T_At (degrees), which is a target value for the angle A of the motor swash plate 46 tentatively calculated without taking account of the movable range of the motor swash plate 46 or the like factors. More specifically, the tentative target angle T_At is calculated by use of the following formula (3):

[Math 1]

$$T\_At = \frac{-Atop + OFFtop + Alow + OFFlow}{Plow - Ptop} \times Ro + \frac{Plow \times (Atop - OFFtop) - Ptop \times (Alow + OFFlow)}{Plow - Ptop} \quad (3)$$

In the above formula (3), Atop is a minimum angle which the motor swash plate 46 can assume, Alow is a maximum angle which the motor swash plate 46 can assume, OFFtop is an offset amount used in determining whether or not the motor swash plate 46 is in a TOP position (whether or not the transmission gear ratio R is TOP), and OFFlow is an offset amount used in determining whether or not the motor swash plate 46 is in a LOW position (whether or not the transmission gear ratio R is LOW). In addition, Ptop and Plow are coefficients for calculation of the target angle T_A of the motor swash plate 46 from the target transmission gear ratio T_R of the continuously variable transmission 16, and show the relation between a voltage inputted to the transmission actuator 50 and the target transmission gear ratio T_R. For example, the relation between a voltage inputted from the ECU 52 to the transmission actuator 50 for moving or holding the motor swash plate 46 into or in the TOP position and the angle A of the motor swash plate 46 determined by driving the transmission actuator 50 attendantly on this voltage is 1.00, whereas the relation between a voltage inputted from the ECU 52 to the transmission actuator 50 for moving or holding the motor swash plate 46 into or in a LOW position and the angle A of the motor swash plate 46 determined by driving the transmission actuator 50 attendantly on this voltage is 3.00.

In step S53, the ECU 52 determines whether or not the tentative target angle T_At is not less than the difference between the minimum angle Atop and the offset amount OFFtop. Where the tentative target angle T_At is not less than the difference between the minimum angle Atop and the offset amount OFFtop (S53: YES), in step S54 the ECU 52 sets the difference between the minimum angle Atop and the offset amount OFFtop as a target angle T_A. Where the tentative target angle T_At is less than the difference between the minimum angle Atop and the offset amount OFFtop (S53: NO), step S55 is entered.

In step S55, the ECU 52 determines whether or not the tentative target angle T_At is not more than the sum of the maximum angle Alow and the offset amount OFFlow. Where the tentative target angle T_At is greater than the sum of the maximum angle Alow and the offset amount OFFlow (S55: NO), in step S56 the ECU 52 sets the tentative target angle T_At as a target angle T_A. Where the tentative target angle T_At is not more than the sum of the maximum angle Alow and the offset amount OFFlow (S55: YES), in step S57 the ECU 52 sets the sum of the maximum angle Alow and the offset amount OFFlow as a target angle T_A.

As has been described above, in this embodiment, the target angle T_A for the motor swash plate 46 corresponding to the target transmission gear ratio T_R is calculated from the target engine speed T_NE, and the actual angle A is changed toward the target angle T_A. This makes it possible to change the actual angle A (actual transmission gear ratio R) toward the target angle T_A (target transmission gear ratio T_R) without waiting for the generation of a difference between the actual engine speed NE and the target engine speed T_NE. Therefore, it is possible to enhance the response of a change in the engine speed NE to a driver's accelerating/decelerating operation.

In addition, while the hydraulic type continuously variable transmission 16 has been used as the continuously variable transmission in the above-described embodiment, this is not limitative, and the method of the present invention is applicable also to other continuously variable transmissions such as frictional type continuously variable transmission (belt-type continuously variable transmission, toroidal continuously variable transmission, etc.), electric power type continuously variable transmission.

While the operating mode has been changed over by use of the operating mode selector switch 68 in the above-described embodiment, the operating mode can be changed over by other methods. For example, the operating mode can also be changed over by the position of a selector lever in an automatic transmission vehicle.

The flow charts shown in FIGS. 3 and 4 merely illustrate an example of carrying out the present invention, and, for example, the order of the steps can be modified, as required. For example, while the target engine speed T_NE was calculated based on the throttle position θ and the vehicle velocity V in separate steps (steps S2 and S4 in FIG. 3) after determination of whether the operating mode being selected was the normal operating mode or the sport operating mode (step S1 in FIG. 3) in the above-described embodiment, the determination of whether the operating mode being selected is the normal operating mode or the sport operating mode may be carried out after calculation of the target engine speed T_NE based on the throttle position θ and the vehicle velocity V.

While the normal operating mode and the sport operating mode were selectively used as the transmission control mode in the above-described embodiment, use of only the sport operating mode (use of the sport operating mode in the above embodiment as a normal operating mode) may also be adopted.

While the normal operating mode and the sport operating mode were used as the transmission control modes in the above-described embodiment, other transmission control mode(s) may also be provided. For example, such transmission control modes as a luxury operating mode for realizing better calmness in the vehicle compartment and a snow mode suited for operating on a snow-covered road can also be used.

While the target transmission gear ratio T_R was obtained and the target angle T_A was calculated correspondingly to the target transmission gear ratio T_R and then a comparison of the actual angle A with the target angle T_A was conducted in the above-described embodiment, such a process is not limitative. For example, a method may be adopted in which the target transmission gear ratio T_R is obtained and the actual transmission gear ratio R is calculated from calculated from the actual angle A, followed by a comparison of the actual transmission gear ratio R with the target transmission gear ratio T_R.

While the actual angle A of the motor swash plate 46 was compared with the target angle T_A in the above-described embodiment, the actual position of the movable part 66 of the transmission actuator 50 may be compared with a target position.

The present invention is not limited to the above-described embodiment, and various configurations can naturally be adopted based on the subject matter of the present specification.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A transmission control method for a swash plate, hydraulic type continuously variable transmission having a plurality of transmission control modes comprising the following steps:
   wherein in a first transmission control mode,
   lowering an actual transmission gear ratio when a target engine speed calculated from vehicle velocity and throttle position is higher than an actual engine speed, and
   raising said actual transmission gear ratio when said target engine speed is lower than said actual engine speed; and
   in a second transmission control mode,
   calculating a target transmission gear ratio based on said target engine speed, which is calculated from said vehicle velocity and said throttle position,
   changing said actual transmission gear ratio toward said calculated target transmission gear ratio,
   said actual transmission gear ratio being changed by hydraulic pressure on a transmission movable member of the continuously variable transmission, and
   said transmission movable member is a motor swash plate or a movable member of a transmission actuator for controlling the angle of said motor swash plate.

2. The transmission control method for the continuously variable transmission as set forth in claim 1,
   wherein in said second transmission control mode,
   calculating said target transmission gear ratio as a function of said target engine speed and said vehicle velocity,
   calculating a target position for said transmission movable member correspondingly to said calculated target transmission gear ratio, and
   changing the actual position of said transmission movable member toward said calculated target position.

3. The transmission control method for the continuously variable transmission as set forth in claim 1, wherein the continuously variable transmission is controlled by an electrical control unit through the transmission actuator.

4. The transmission control method for the continuously variable transmission as set forth in claim 3, wherein the electronic control unit produces a control signal in accordance with engine speed detected by an engine speed sensor, a position of a throttle valve according to an operation of a throttle grip detected by a throttle position sensor and a vehicle velocity detected by a vehicle velocity sensor, said control signal controls the transmission actuator.

5. The transmission control method for the continuously variable transmission as set forth in claim 4, wherein said transmission actuator is operatively connected to the swash plate,
   wherein the angle of the swash plate is controlled by the movement of the transmission actuator.

6. The transmission control method for the continuously variable transmission as set forth in claim 1, wherein the target transmission gear ratio is calculated by the formula:

$$T\_R = (T\_NE/V) \times Ro \times 0.06$$

wherein:
   $T\_NE$ is the target engine speed,
   $V$ is the vehicle velocity,
   $Ro$ is the reduction gear ratio of the other transmission gear, and
   0.06 is a coefficient for unit matching.

7. The transmission control method for the continuously variable transmission as set forth in claim 5, wherein the angle of the swash plate is calculated by the electrical control unit according to position information of a movable part of the transmission actuator.

8. The transmission control method for the continuously variable transmission as set forth in claim 5, wherein the angle of the swash plate is calculated by an angle sensor.

9. A transmission control method for a swash plate, hydraulic type continuously variable transmission comprising the following steps:
   calculating a target transmission gear ratio from a target engine speed, which is calculated from vehicle velocity and throttle position, and said vehicle velocity, and
   changing an actual transmission gear ratio toward said calculated target transmission gear ratio,
   said actual transmission gear ratio being changed by hydraulic pressure on a transmission movable member of the continuously variable transmission, and
   said transmission movable member is a motor swash plate or a movable member of a transmission actuator for controlling the angle of said motor swashplate.

10. The transmission control method for the continuously variable transmission as set forth in claim 9, wherein the continuously variable transmission is controlled by an electrical control unit through the transmission actuator.

11. The transmission control method for the continuously variable transmission as set forth in claim 10, wherein the electronic control unit produces a control signal in accordance with engine speed detected by an engine speed sensor, a position of a throttle valve according to an operation of a throttle grip detected by a throttle position sensor and a vehicle velocity detected by a vehicle velocity sensor, said control signal controls the transmission actuator.

12. A transmission control method for a hydraulic type continuously variable transmission having a plurality of transmission control modes comprising the following steps:
   wherein in a first transmission control mode,
   calculating a target engine speed from a vehicle velocity and throttle position;
   lowering an actual transmission gear ratio when the target engine speed is higher than an actual engine speed, and
   raising said actual transmission gear ratio when said target engine speed is lower than said actual engine speed; and
   in a second transmission control mode,
   calculating a target transmission gear ratio based on said target engine speed and said vehicle velocity, and
   changing said actual transmission gear ratio toward said calculated target transmission gear ratio,
   said actual transmission gear ratio being changed by hydraulic pressure on a transmission movable member of the continuously variable transmission
   wherein the continuously variable transmission is controlled by an electrical control unit through a transmission actuator,
   the electronic control unit produces a control signal in accordance with engine speed detected by an engine speed sensor, a position of a throttle valve according to an operation of a throttle grip detected by a throttle position sensor and a vehicle velocity detected by a vehicle velocity sensor, and
   the control signal controls the transmission actuator.

13. The transmission control method for the continuously variable transmission as set forth in claim 12,
  wherein in said second transmission control mode,
  calculating said target transmission gear ratio as a function of said target engine speed and said vehicle velocity,
  calculating a target position for said transmission movable member correspondingly to said calculated target transmission gear ratio, and
  changing the actual position of said transmission movable member toward said calculated target position.

14. The transmission control method for the continuously variable transmission as set forth in claim 13,
  wherein said continuously variable transmission is a swash plate, hydraulic type continuously variable transmission, and
  said transmission movable member is a motor swash plate or a movable member of the transmission actuator for controlling the angle of said motor swash plate.

15. The transmission control method for the continuously variable transmission as set forth in claim 12, wherein said transmission actuator is operatively connected to a swash plate wherein the angle of the swash plate is controlled by the movement of the transmission actuator.

16. The transmission control method for the continuously variable transmission as set forth in claim 15, wherein the angle of the swash plate is calculated by the electrical control unit according to position information of a movable part of the transmission actuator.

17. The transmission control method for the continuously variable transmission as set forth in claim 15, wherein the angle of the swash plate is calculated by an angle sensor.

18. The transmission control method for the continuously variable transmission as set forth in claim 12, wherein the target transmission gear ratio is calculated by the formula:

$$T\_R = (T\_NE/V) \times Ro \times 0.06$$

wherein:
  T_NE is the target engine speed,
  V is the vehicle velocity,
  Ro is the reduction gear ratio of the other transmission gear, and
  0.06 is a coefficient for unit matching.

* * * * *